US006667788B1

(12) United States Patent
Maruyama et al.

(10) Patent No.: US 6,667,788 B1
(45) Date of Patent: Dec. 23, 2003

(54) METHOD FOR PRODUCING IMAGE ON LIQUID CRYSTAL PANEL, LIQUID CRYSTAL PANEL AND LIQUID CRYSTAL DISPLAY EQUIPPED WITH THE SAME

(75) Inventors: Muneo Maruyama, Tokyo (JP); Eriko Fujimaki, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 178 days.

(21) Appl. No.: 09/593,686

(22) Filed: Jun. 14, 2000

(30) Foreign Application Priority Data

Jun. 15, 1999 (JP) ............................................. 11-167708

(51) Int. Cl.[7] ............................................. G02F 1/1335
(52) U.S. Cl. .................... 349/115; 349/98; 349/176; 349/185; 349/194
(58) Field of Search ......................... 349/115, 62, 71, 349/96, 97, 98, 175, 176, 185, 194

(56) References Cited

U.S. PATENT DOCUMENTS 5,822,029 A * 10/1998 Davis et al. ................ 349/115
6,025,899 A * 2/2000 Fukunaga et al. .......... 349/115
6,061,108 A * 5/2000 Anderson et al. ............. 349/98
6,094,242 A * 7/2000 Yamanaka .................... 349/13
6,113,239 A * 9/2000 Sampsell et al. ............. 353/31
6,177,216 B1 * 1/2001 Broer et al. .................. 430/7
6,266,113 B1 * 7/2001 Yamazaki et al. .......... 349/115
6,281,955 B1 * 8/2001 Midorikawa et al. ....... 349/106
6,307,604 B1 * 10/2001 Hikmet et al. ................ 349/71

FOREIGN PATENT DOCUMENTS

JP          8-234196          9/1996

* cited by examiner

Primary Examiner—Robert H. Kim
Assistant Examiner—Hoan Nguyen
(74) Attorney, Agent, or Firm—Foley & Lardner

(57) ABSTRACT

A liquid crystal panel has a cholesteric filter and the quarter wave plate inserted between a glass substrate and color filter elements, and each section of the cholesteric filter reflects either right-handed or left-handed circularly polarized light component recognized as one of the three primary colors and the circularly polarized light components recognized as other primary colors toward a light source so as to recycle these circularly polarized light components, thereby enhancing the utilization factor of incident light without increase of power consumption.

16 Claims, 5 Drawing Sheets

METHOD FOR PRODUCING IMAGE ON LIQUID CRYSTAL PANEL, LIQUID CRYSTAL PANEL AND LIQUID CRYSTAL DISPLAY EQUIPPED WITH THE SAME

FIELD OF THE INVENTION

This invention relates to a liquid crystal display and, more particularly, to a method for producing an image on a liquid crystal panel, the liquid crystal panel and a liquid crystal display equipped with the liquid crystal panel.

DESCRIPTION OF THE RELATED ART

A typical example of the liquid crystal display is shown in FIG. 1 of the drawings. The prior art liquid crystal display is broken down into a liquid crystal panel, a pair of polarizing plates 201/208 and a back light source 209. The liquid crystal panel is sandwiched between the polarizing plates 201 and 208, and light is radiated from the back light source 209 through the polarizing plate 208 to the liquid crystal panel.

The liquid crystal panel includes a pair of glass substrates 202 and 207 and liquid crystal 205 filling the gap between the glass substrates 202 and 207. Color filter elements 203R, 203G and 203B are arranged on the inner surface of the glass substrate 202, and the color filter elements 203R/203G/203B are covered with a common electrode 204. On the other hand, segment electrodes 206 are arrayed on the inner surface of the other glass substrate 207, and the segment electrodes 206 are aligned with the color filter elements 203R/203G/203B. The color filter elements 203R, 203G and 203B respectively transmit wavelengths recognized as red, wavelengths recognized as green and wavelengths recognized as blue therethrough, and a set of color filter elements 203R, 203G and 203B is associated with a pixel.

The color filters 203R/203G/203B and the common electrode 204 are formed on the inner surface of the glass substrate 202, and the segment electrodes 206 are formed on the inner surface of the other glass substrate 207. The glass substrates 201 and 207 are assembled together, and the liquid crystal 205 is injected into the gal between the glass substrates 202 and 207.

When a potential difference is applied between the common electrode 204 and selected segment electrodes 206, the liquid crystal changes the orientation of the liquid crystal molecules between the selected segment electrodes 206 and the color filter elements 203R/203G/203B. The back light source 209 radiates light toward the liquid crystal panel, and the liquid crystal molecules between the selected segment electrodes 206 and the common electrode 204 allow the light to pass therethrough. Thus, the light components are incident onto the color filter elements 203R/203G/203B. The color filter elements 203R/203G/203B absorb particular wavelengths of the incident light components, and transmits other wavelengths of the incident light components to the outside of the liquid crystal panel. The transmitted light components produce a color image on the liquid crystal panel.

A problem is encountered in the prior art liquid crystal display in a low transmittance of the light and a low production yield. The low transmittance is derived from the absorption of the incident light components. Each color filter element 203R/203G/203B absorbs two third of the incident light components, and only a third of the incident light components participates the production of the color image. The utilization factor of the Incident light is low. This is the first problem inherent in the prior art liquid crystal display. The low production yield is due to misalignment between the segment electrodes 206 and the color filter elements 203R/203G/203B. Even if the misalignment is not serious, the color image is not sharp.

The first problem may be solved by using a cholesteric filter disclosed in Japanese Patent Publication of Unexamined Application No. 8-234196. FIG. 2 illustrates the prior art cholesteric filter disclosed in the Japanese Patent Publication of Unexamined Application.

A light source 10 is encircled with a reflecting mirror 12, and a circularly polarizing plate 16 is provided between the light source 10 and the prior art cholesteric filter 18. The light source 10 generates the natural light, and the reflecting mirror 12 directs the natural light toward the circularly polarized plate 16. The light source 10, the reflecting mirror 12 and the circularly polarized plate 16 as a whole constitute a polarized light source. The polarized light source radiates circularly polarized light, which is polarized in a particular direction, toward the prior art cholesteric filter 18.

The prior art cholesteric filter 18 transmits the circularly polarized light of a particular waveband, but the circularly polarized light of the other waveband is reflected thereon. The prior art cholesteric filter 18 consists of two filter layers 20 and 22, and the filter layers 20/22 are divided into sections R, G and B. The sections R transmit wavelength components recognized as green and blue, and reflects the wavelength components recognized as red. The sections G transmit wavelength components recognized as red and blue, and reflect other the wavelength components recognized as green. The sections B transmit wavelength components recognized as red and green, and reflect the other wavelength components recognized as blue. The sections R/G/B of the filter layer 20 are offset from the sections R/G/B of the other filter layer 22. If the section B is overlapped with the section R, the part of the cholesteric filter 18 transmits the wavelength components recognized as green. Similarly, the wavelength components recognized as blue pass the section R overlapped with the section G, and the wavelength components recognized as red pass the section G overlapped with the section B. Two third of the incident light is previously reflected toward the circularly polarized light source, and is reused. For this reason, the utilization factor is increased.

When the cholesteric filter 18 is applied to a liquid crystal display, the cholesteric filter is inserted between the substrates. Noise component of the transmitted light component is absorbed by using a color filter.

However, the second problem is also encountered in a liquid crystal display equipped with the prior art cholesteric filter due to the misalignment between the pixels, the sections R/G/B of the cholesteric filter and the color filter during the assembling work. Even if the misalignment is not serious, the color image is not sharp.

SUMMARY OF THE INVENTION

It is therefore an important object of the present invention to provide a method for producing a clear color image on a liquid crystal display.

It is also an important object of the present invention to provide a liquid crystal panel, which is fabricated at a high yield.

It is also an important object of the present invention to provide a liquid crystal display, which is equipped with the liquid crystal panel for producing a sharp color image through the method.

To accomplish the object, the present invention proposes to recycle circularly polarized light components reflected on a cholesteric filter.

In accordance with one aspect of the present invention, there is provided a method for producing a visual image on a liquid crystal display comprising the steps of radiating an incident light, selecting one of the right-handed circularly polarized light component and the left-handed circularly polarized light component of a waveband from the incident light so as to recycle the other of the right-handed circularly polarized light component and the left-handed circularly polarized light component of the waveband and other light components of other wavebands of the incident light as a part of the incident light, converting the aforesaid one of the right-handed circularly polarized light component and the left-handed circularly polarized light component to a linearly polarized light component, removing a noise component of the other wavebands from the linearly polarized light component, if any, and producing a visual image from the linearly polarized light component by changing an orientation of liquid crystal molecules forming a part of an electric shutter.

In accordance with another aspect of the present invention, there is provided a liquid crystal panel comprising transparent substrates having respective inner surfaces opposed to each other by a gap, an electric shutter provided in the gap and including plural segment electrodes, a common electrode opposed to the plural segment electrodes and plural pieces of liquid crystal filling a gap between the plural segment electrodes and the common electrode so as to selectively changing orientations of the plural pieces of liquid crystal depending upon potential differences between the plural segment electrodes and the common electrode, and a spectroscope including a cholesteric filter formed over one of the transparent substrates for transmitting one of the right-handed circularly polarized light component and the left-handed circularly polarized light component of a waveband incorporated in an incident light toward the electric shutter and reflecting the other of the right-handed circularly polarized light component and the left-handed circularly polarized light component of the waveband and other light components of other wavebands incorporated in the incident light in the opposite direction to that of the aforesaid one of the right-handed circularly polarized light component and the left-handed circularly polarized light component of said waveband, a converter formed on a surface of the cholesteric filter on the opposite side to the aforesaid one of the transparent substrates for converting the aforesaid one of the right-handed circularly polarized light component and the left-handed circularly polarized light component to the linearly polarized light component of the waveband and a filter formed on a surface of the converter on the opposite side to the cholesteric filter for eliminating a noise component of the other wavebands from the linearly polarized light component.

In accordance with yet another aspect of the present invention, there is provided a liquid crystal display for producing a visual image comprising a liquid crystal panel including transparent substrates having respective inner surfaces opposed to each other by a gap, an electric shutter provided in the gap and including plural segment electrodes, a common electrode opposed to the plural segment electrodes and plural pieces of liquid crystal filling a gap between the plural segment electrodes and the common electrode so as to selectively changing orientations of the plural pieces of liquid crystal depending upon potential differences between the plural segment electrodes and the common electrode, thereby producing a visual image and a spectroscope including a cholesteric filter formed over one of the transparent substrates for transmitting one of the right-handed circularly polarized light component and the left-handed circularly polarized light component of a waveband incorporated in an incident light toward the electric shutter and reflecting the other of the right-handed circularly polarized light component and the left-handed circularly polarized light component of the waveband and other light components of other wavebands incorporated in the incident light, a converter formed on a surface of the cholesteric filter on the opposite side to the aforesaid one of the transparent substrates for converting the aforesaid one of the right-handed circularly polarized light component and the left-handed circularly polarized light component to the linearly polarized light component of the waveband and a filter formed on a surface of the converter on the opposite side to the cholesteric filter for eliminating a noise component of the other wavebands from the linearly polarized light component, and a light source radiating the incident light containing the other of the right-handed circularly polarized light component and the left-handed circularly polarized light component of the waveband and other light components of other wavebands toward the liquid crystal panel.

BRIEF DESCRIPTION OF THE DRAWINGS

The features and advantages of the method, the liquid crystal panel and the liquid crystal display will be more clearly understood from the following description taken in conjunction with the accompanying drawings in which.

DESCRIPTION OF TH PREFERRED EMBODIMENT

Figure 1:
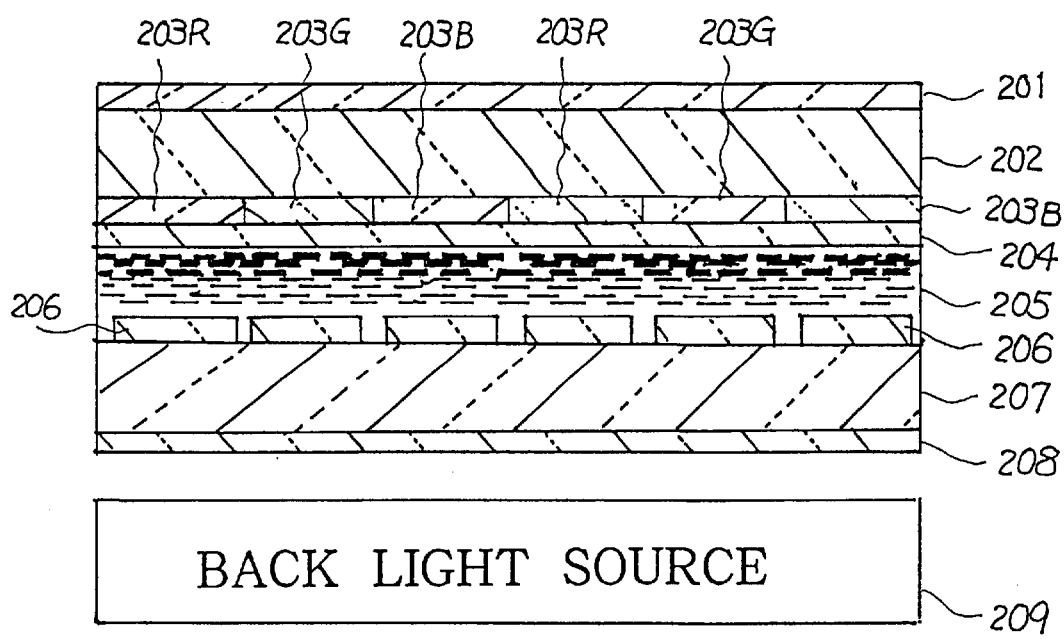
FIG. 1 is a cross sectional view showing the prior art liquid crystal display.
Figure 2:
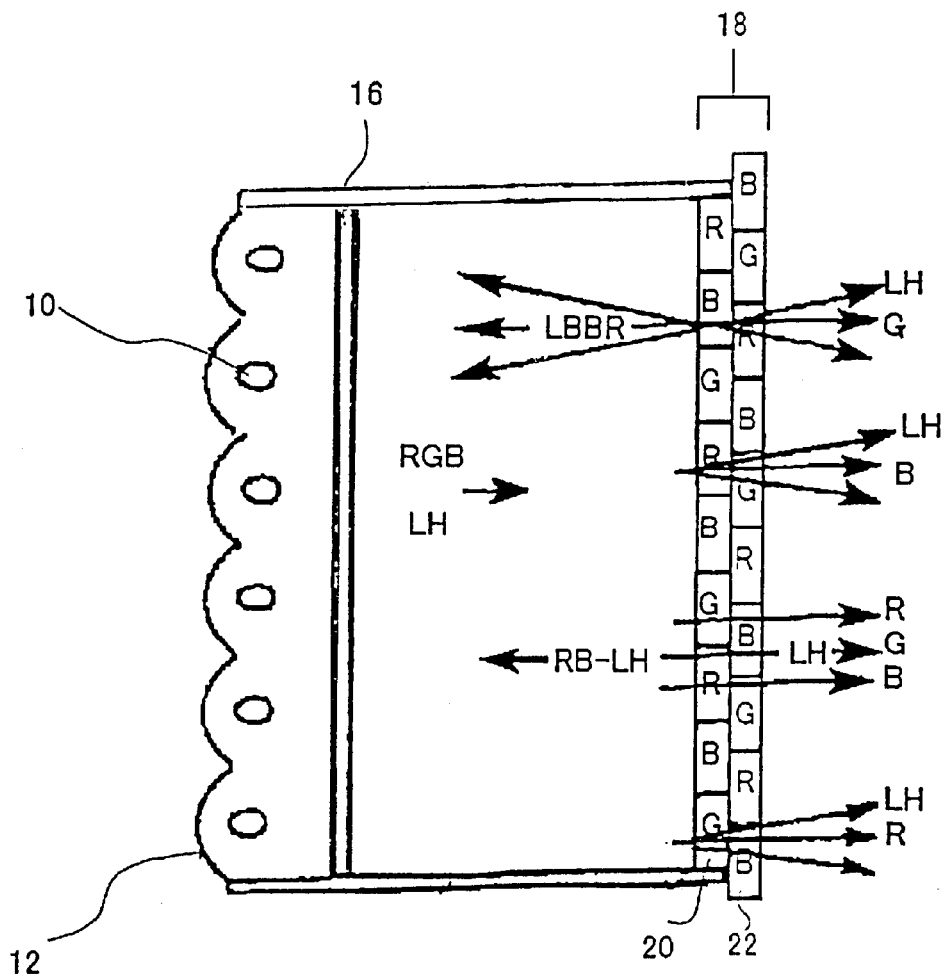
FIG. 2 is a view showing the prior art cholesteric filter disclosed in Japanese Patent Publication of Unexamined Application No. 8-234196.
Figure 3:
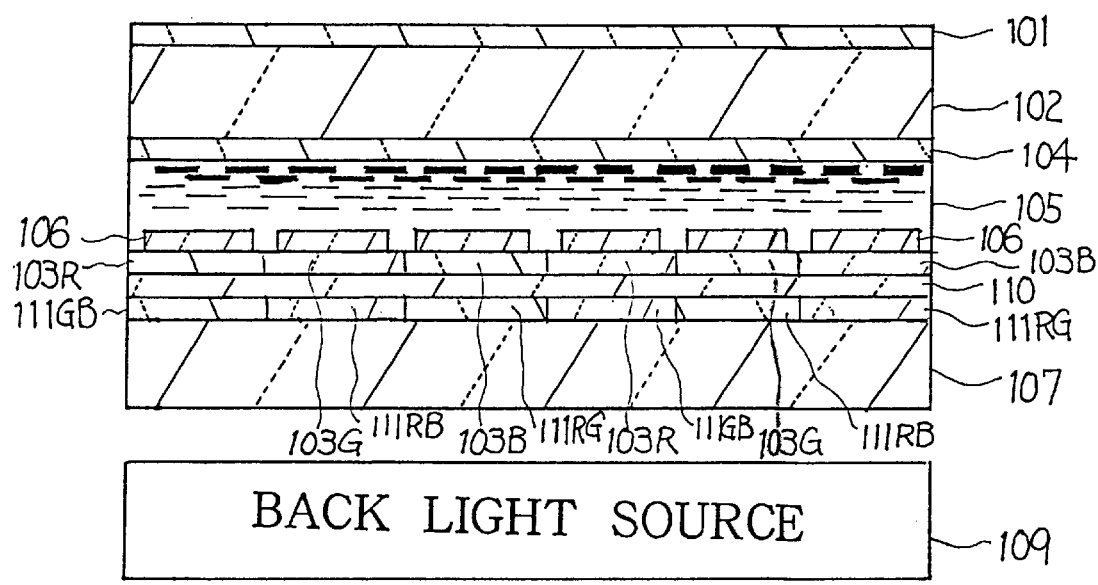
FIG. 3 is a cross sectional view showing the structure of a liquid crystal display according to the present invention.

Referring to FIG. 3 of the drawings, a liquid crystal color display embodying the present invention largely comprises a liquid crystal panel, polarizing plates 101 and a source of back light 109. The polarizing plate 101 is attached to a light output surface of the liquid crystal panel, and the source of back light 109 is opposed to a light incident surface of the liquid crystal panel. The source of back light 109 includes a cold cathode fluorescent lamp, an optical guide plate, a diffusion sheet and a reflecting plate, and serves as a surface light source. Dots are printed on the optical guide plate for scattering the light, and the optical guide plate makes the light uniform over the light output surface opposed to the liquid crystal panel. The reflecting mirror may be replaced with a coating with a large reflectance or a half-mirror. The source of back light 109 radiates incident light to the light incident surface of the liquid crystal panel, and a color image is produced on the polarizing plate 101.

The liquid crystal panel includes a pair of glass substrates 102 and 107, color filter elements 103R/103G/103B, a common electrode 104, liquid crystal 105, segment electrodes 106, a quarter wave plate 110 and a cholesteric filter 111GB/111RB/111RG. The glass substrate 102 is spaced from the other glass substrate 107, and a gap is defined between the inner surface of the glass substrate 102 and the inner surface of the other glass substrate 107.

The common electrode 104 is formed on the inner surface of the glass substrate 102. On the other hand, the cholesteric filter 111GB/111RB/111RG are formed on the inner surface of the other glass substrate 107, and are covered with the quarter wave plate 110. The color filter elements 103R/103G/103B are formed on the quarter wave plate 110, and the segment electrodes 106 are respectively arranged on the color filter elements 103R/103G/103B. The segment electrodes 106, the common electrode 104 and the liquid crystal 105 form electric shutter units, and the electric shutter units are selectively opened and closed depending upon the potential difference applied between the common electrode 104 and the segment electrodes 106.

The color filter elements 103R, 10G and 103B absorb the light components recognized as green and blue, the light components recognized as red and blue and the light components recognized as red and green, respectively, and transmit the light component recognized as red, the light component recognized as green and the light component recognized as blue. The color filter elements 103R, 103G and 103B are formed of pigment dispersed resin.

Figure 5:
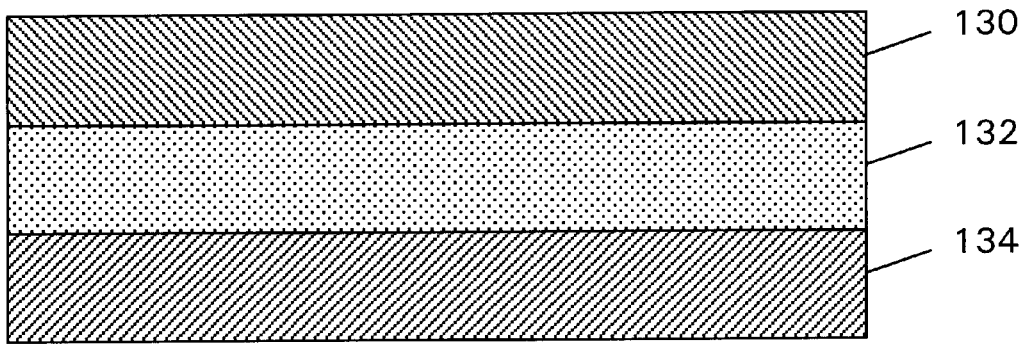
FIG. 5 is a view showing a three layered cholesteric filter.
Figure 6:
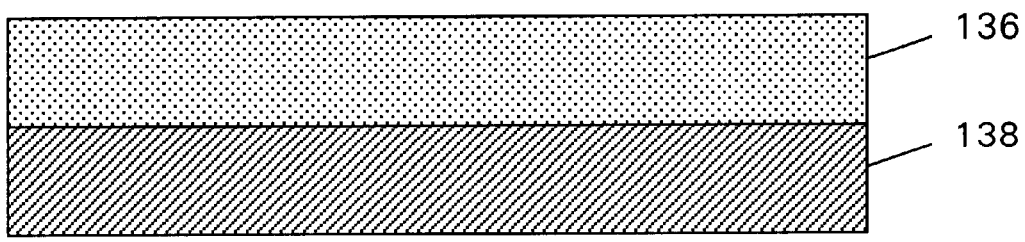
FIG. 6 is a view showing a two layered cholesteric filter.

The individual cholesteric filters may comprise three layers 130, 132, 134, as illustrated in FIG. 5. Alternatively, the individual cholesteric filters may comprise two layers 136, 138 as illustrated in FIG. 6.

The cholesteric filter 111GB/111RB/111RG is formed of polymeric cholesteric liquid crystal. The cholesteric filter is divided into sections 111GB, 111RB and 111RG, and the sections 111GB, 111RB and 111RG are aligned with the color filter elements 103R, 103G and 103B, respectively. The sections 111GB/111RB/111RG cooperate with the color filter elements for transmitting the light component recognized as red, the light component recognized as green and the light component recognized as blue, and the electric shutter units produce a color image on the polarization plate 101.

The sections 111GB have a laminated structure of three cholesteric liquid crystal layers. The first cholesteric liquid crystal layer has the helical pitch equal to the central wavelength of the light component recognized as red, and the helical structure is opposite in direction to the direction of the circularly polarized light to be transmitted. The second cholesteric liquid crystal layer has the helical pitch equal to the central wavelength of the light component recognized as green, and the third cholesteric liquid crystal layer has the helical pitch equal to the central wavelength of the light component recognized as blue. The section 111GB may have a laminated structure of two cholesteric liquid crystal layers. In this instance, the first cholesteric liquid crystal layer has the helical pitch equal to the central wavelength of the light component recognized as red, and the helical structure is opposite in direction to the circularly polarized light to be transmitted. The second cholesteric liquid crystal layer has the helical pitch equal to the central wavelength of the light component to be recognized as green. Otherwise, the second cholesteric liquid crystal layer has the helical pitch equal to the central wavelength of the light component recognized as blue.

The sections 111RB have a laminated structure of three cholesteric liquid crystal layers. The first cholesteric liquid crystal layer has the helical pitch equal to the central wavelength of the light component recognized as green, and the helical structure is opposite in direction to the direction of the circularly polarized light to be transmitted. The second cholesteric liquid crystal layer has the helical pitch equal to the central wavelength of the light component recognized as red, and the third cholesteric liquid crystal layer has the helical pitch equal to the central wavelength of the light component recognized as blue. The section 111RB may have a laminated structure of two cholesteric liquid crystal layers. In this instance, the first cholesteric liquid crystal layer has the helical pitch equal to the central wavelength of the light component recognized as green, and the helical structure is opposite in direction to the circularly polarized light to be transmitted. The second cholesteric liquid crystal layer has the helical pitch equal to the central wavelength of the light component to be recognized as red. Otherwise, the second cholesteric liquid crystal layer has the helical pitch equal to the central wavelength of the light component recognized as blue.

The sections 111RG have a laminated structure of three cholesteric liquid crystal layers. The first cholesteric liquid crystal layer has the helical pitch equal to the central wavelength of the light component recognized as blue, and the helical structure is opposite in direction to the direction of the circularly polarized light to be transmitted. The second cholesteric liquid crystal layer has the helical pitch equal to the central wavelength of the light component recognized as red, and the third cholesteric liquid crystal layer has the helical pitch equal to the central wavelength of the light component recognized as green. The section 111RG may have a laminated structure of two cholesteric liquid crystal layers. In this instance, the first cholesteric liquid crystal layer has the helical pitch equal to the central wavelength of the light component recognized as blue, and the helical structure is opposite in direction to the circularly polarized light to be transmitted. The second cholesteric liquid crystal layer has the helical pitch equal to the central wavelength of the light component to be recognized as red. Otherwise, the second cholesteric liquid crystal layer has the helical pitch equal to the central wavelength of the light component recognized as green.

The quarter wave plate 110 is formed of liquid crystal compound. Nematic liquid crystal is mixed with ultraviolet cured resin, and the liquid crystal compound is formed from the mixture. The nematic liquid crystal is, by way of example, in one of the cyano-system, the fluorine-system and the chlorine-system. High molecular liquid crystal may be used for the mixture. The ultraviolet cured resin is, by way of example, monofunctional acrylate compound, monofunctional methacrylate, polyfunctional acrylate compound or polyfunctional methacrylate compound. The ultraviolet cured resin may be formed of one of these compounds. Otherwise, more than one of the compounds may be polymerized for the ultraviolet cured resin. Photo-polymerization initiator may be added to the compound or the compounds for accelerating the polymerization. The photo-polymerization initiator is, by way of, in the thioxanthene system, diazonium salt system, sulfonium salt system, iodine salt system or selenium salt system. Additive for orientation is used for the orientation of the liquid crystal, and the mixture is cured through radiation of the ultra violet light for producing the quarter wave plate 110. It is arbitrary to direct the lag axis of the quarter wave plate 110 and the major axis of the liquid crystal molecule.

The liquid crystal panel is fabricated as follow. As described hereinbefore, various polymeric cholesteric liquid crystal layers are combined for forming the cholesteric filter 111GB/111RB/111RG. One kind of polymeric cholesteric liquid crystal is spread over the inner surface of the glass substrate 107, and the polymeric cholesteric liquid crystal layer is selectively removed through a photo-lithography. The coating step and the photo-lithography are repeated so as to form the cholesteric filter 111GB/111RG/111RB.

The liquid crystal compound is spread over the cholesteric filter 111GB/111RG/111RB, and the quarter wave plate 110 is formed from the liquid crystal compound layer.

Red pigment dispersed resin is, by way of example, spread over the quarter wave plate 110, and is patterned into the color filter elements 103R through the photo-lithography. The coating step and the photo-lithography are repeated for the color filter elements 103G and the color filter elements 103B.

Thus, the photo-lithography is repeated for the cholesteric filter 111GB/111RG/111RB and the color filter elements 103R/103G/103B. An alignment mark (not shown) is formed on the glass substrate 107, and the alignment is carried out by using the alignment mark. For this reason, the sections 111GB, 111RB and 111RG arc exactly aligned with the color filter elements 103R, 103G and 103B, respectively.

Figure 4:
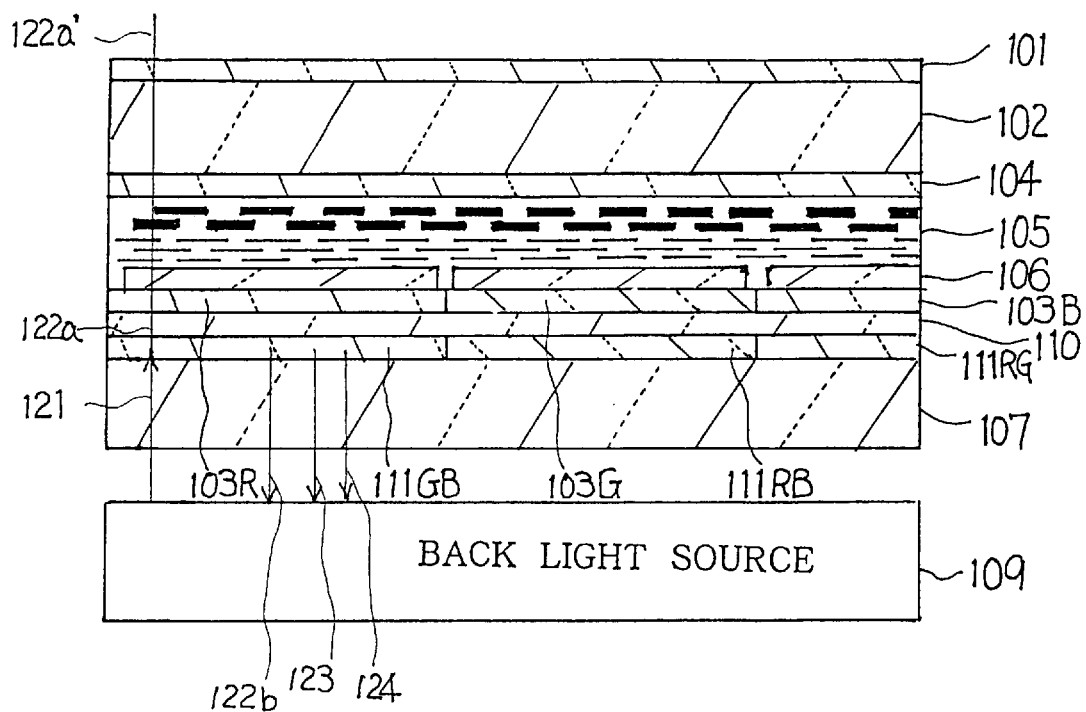
FIG. 4 is a view showing the behavior of light incident on the liquid crystal display.

The liquid crystal display produces a color image as follows. FIG. 4 illustrates a method for producing an image. It is assumed that the section 111GB is adapted to transmit the right-handed circularly polarized light component recognized as red and that the leftmost electric shutter unit is turned on. The incident light 121 passes through the glass substrate 107, and reaches the section 111GB of the cholesteric filter. The section GB transmits the right-handed circularly polarized light component 122a recognized as red to the quarter wave plate 110. However, the section GB reflects the left-handed circularly polarized light component 122b recognized as red together with the right-handed or left-handed circularly polarized light component 123 recognized as green and the right-handed or left-handed circularly polarized light component recognized as blue 124 toward the source of back light 109. The right-handed circularly polarized light component 122a recognized as red is incident onto the quarter wave plate 110, and the quarter wave plate 110 converts the right-handed circularly polarized light component 122a recognized as red to linearly polarized light component 122a' recognized as red. The linearly polarized light component 122a' recognized as red passes through the color filter element 103R, and enters into the associated electric shutter unit 106/105/104. The electric shutter unit has been already opened, and the linearly polarized light component 122a' recognized as red passes through the glass substrate 102, and enters into the polarizing plate 101. The linearly polarized light component 122a' produces a part of a color image recognized as red on the polarizing plate 101. Parts of the light components recognized as green and blue may pass through the section 111GB. However, the color filter element 103R absorbs the parts of the light components recognized as green and blue. Thus, the color filters 103R/103G/103B enhance the color purity. If the section 111GB is adopted to transmit the left-handed circularly polarized light component recognized as red, the right-handed circularly polarized light component is reflected as labeled with 122b.

The circularly polarized light components 122b, 123 and 124 arc recycled through the diffusion sheet, the optical guide plate and the reflecting plate. The sections RB and the sections RG selectively reflect the circularly polarized light components as similar to the sections GB, and the reflected light components are recycled. As a result, the cholesteric filter 111GB/111RG/111RB enhances the utilization factor of the light radiated from the source of back light 109. In other words, the liquid crystal display according to the present invention enhances the brightness without increase of the electric power consumption.

Moreover, the color filters 103R/103G/103B absorb the unintentionally transmitted light components recognized as green and blue, the unintentionally transmitted light components recognized as red and blue and the unintentionally transmitted light components recognized as red and green, respectively. Thus, the color filters 103R/103G/103B enhance the color purity of the color image produced on the liquid crystal display according to the present invention.

Finally, the sections 111GB/111RB/111RG of the cholesteric filter, the quarter wave plate 110 and the color filter elements 103R/103G/103B are laminated on the single glass substrate 107, and the manufacturer can exactly align the sections 111GB/111RB/111RG of the cholesteric filter with the color filter elements 103R/103G/103B, respectively. For this reason, the production yield of the liquid crystal panel is higher than that of the prior art liquid crystal display.

As will be appreciated from the foregoing description, the cholesteric filter 111GB/111RG/111RB selectively reflects the light components before entry into the color filter elements 103R/103G/103B. Although the reflected light components werc absorbed by the color filters in the prior art liquid crystal display, they are recycled in the liquid crystal display according to the present invention. This results in enhancement of the utilization factor of the light.

Although a particular embodiment of the present invention has been shown and described, it will be apparent to those skilled in the art that various changes and modifications may be made without departing from the spirit and scope of the present invention.

In the above-described embodiment, the section GB contains the cholesteric liquid crystal layers with the helical pitches respectively adjusted to the central wavelengths of the light components recognized as green and blue. In this instance, those cholesteric liquid crystal layers can reflect both of the right-handed circularly polarized light component and the left-handed circularly polarized light component. The cholesteric liquid crystal layers may have the directions of helical structures opposite to one another. Each of the sections 111RB/111RG may also have the cholesteric liquid crystal layers with the helical structures opposite to one another.

The sections 111GB/111RB/111RG have the cholesteric liquid crystal layers with the helical pitches equal to the central wavelength of the light components recognized as red, green and blue, each of those cholesteric liquid crystal layers may be accompanied with 1 to 10 liquid crystal layers with the helical pitches sequentially offset from the central wavelength by 10 nanometers to 120 nanometers. The cholesteric liquid crystal layers thus laminated increases the reflection, and achieve the utilization factor higher than that of the above-described embodiment without increase of the electric power consumption.

If the quarter wave plate 110 outputs elliptically polarized light components closer to the linearly polarized light components, the contrast of the color image is reduced. In order to prevent the color image from low contrast, a polarizer may be inserted between the segment electrodes 106 and the quarter wave plate 110. The polarizer may be formed of dichromic dye dispersed liquid crystal compound. The liquid crystal compound is the material used for the quarter wave plate 110. When the elliptic axis of the elliptically polarized light component is aligned with the transmitting direction of the polarizer, the liquid crystal display produces a high contrast color image.

What is claimed is:

1. A method in a liquid crystal display for producing a visual image, comprising:

radiating incident light on a light input surface of said display;

passing components of said incident light within respective predetermined wavebands and having a predetermined circular polarization direction by respective cholesteric filters of a matrix of cholesteric filters internal to said liquid crystal display, and reflecting remaining components of said incident light by said respective cholesteric filters;

linearly polarizing said components passed by said respective cholesteric filters by a quarter wave plate;

passing said components polarized by said quarter wave plate by respective color filters aligned with and corresponding to each of said respective cholesteric filters, and absorbing noise portions of said components polarized by said quarter wave plate by said respective color filters; and selectively passing said components passed by said respective color filters through respective electric shutters comprising electrodes aligned with said color filters of said color filter matrix.

2. The method claimed in claim 1, wherein said incident light comprises components in a red waveband, components in a blue waveband, and components in a green waveband.

3. The method claimed in claim 1, wherein each of said respective predetermined wavebands is one of a red waveband, a blue waveband, and a green waveband.

4. The method claimed in claim 1, wherein each of said respective cholesteric filters comprises first and second layers, and wherein selectively passing components by each of said respective cholesteric filters comprises:

reflecting incident light within said predetermined waveband of said cholesteric filter and having a circular polarization direction opposite to said predetermined circular polarization direction of said cholesteric filter by said first layer; and reflecting incident light within a first waveband outside of said predetermined waveband of said cholesteric filter by said second layer.

5. The method claimed in claim 1, wherein each of said respective cholesteric filters comprises first, second and third layers, and wherein selectively passing components by each of said cholesteric filters comprises:

reflecting incident light within said predetermined waveband of said cholesteric filter and having a circular polarization direction opposite to said predetermined circular polarization direction of said cholesteric filter by said first layer; and reflecting incident light within a first waveband outside of said predetermined waveband of said cholesteric filter by said second layer; and reflecting incident light within a second waveband outside of said predetermined waveband of said cholesteric filter by said third layer.

6. A liquid crystal panel comprising:

first and second opposing transparent substrates having respective inner surfaces separated by a gap;

a matrix of cholesteric filters formed on the inner surface of the first substrate, each of said cholesteric filters passing components of incident light within a respective predetermined waveband and having a predetermined circular polarization direction, and reflecting remaining components of said incident light;

a quarter wave plate formed on said matrix of cholesteric filters for linearly polarizing said components passed by said cholesteric filters;

a matrix of color filters formed on said quarter wave plate, each of said color filters being aligned with a corresponding respective cholesteric filter of said matrix of cholesteric filters, each of said color filters passing light within the respective predetermined waveband of its corresponding cholesteric filter and absorbing light not within the respective predetermined waveband of its corresponding cholesteric filter;

a matrix of pixel electrodes formed on said matrix of color filters, each of said pixel electrodes being aligned with a corresponding respective color filter of said matrix of color filters;

a common electrode formed on the inner surface of the second substrate; and a liquid crystal material disposed between said matrix of pixel electrodes and said common electrode.

7. The liquid crystal panel claimed in claim 6, wherein said incident light comprises components in a red waveband, components in a blue waveband, and components in a green waveband.

8. The liquid crystal panel claimed in claim 6, wherein the respective predetermined waveband of each of said cholesteric filters is one of a red waveband, a blue waveband, and a green waveband.

9. The liquid crystal panel claimed in claim 6, wherein each of said cholesteric filters comprises a first layer corresponding to said respective predetermined waveband of said cholesteric filter, and a second layer corresponding to a first waveband to be reflected by said cholesteric filter.

10. The liquid crystal panel claimed in claim 6, wherein each of said cholesteric filters comprises a first layer corresponding to said respective predetermined waveband of said cholesteric filter, and a second layer corresponding to a first waveband to be reflected by said cholesteric filter, and a third layer corresponding to a second waveband to be reflected by said cholesteric filter.

11. A liquid crystal display for producing a visual image, comprising:

a liquid crystal panel including:

first and second opposing transparent substrates having respective inner surfaces separated by a gap;

a matrix of cholesteric filters formed on the inner surface of the first substrate, each of said cholesteric filters passing components of incident light within a respective predetermined waveband and having a predetermined circular polarization direction, and reflecting remaining components of said incident light;

a quarter wave plate formed on said matrix of cholesteric filters for linearly polarizing said components passed by said cholesteric filters;

a matrix of color filters formed on said quarter wave plate, each of said color filters being aligned with a corresponding respective cholesteric filter of said matrix of cholesteric filters, each of said color filters passing light within the respective predetermined waveband of its corresponding cholesteric filter and absorbing light not within the respective predetermined waveband of its corresponding cholesteric filter;

a matrix of pixel electrodes formed on said matrix of color filters, each of said pixel electrodes being aligned with a corresponding respective color filter of said matrix of color filters;

a common electrode formed on the inner surface of the second substrate; and to a liquid crystal material disposed between said matrix of pixel electrodes and said common electrode; and a light source for radiating incident light on an outer surface of said first substrate.

12. The liquid crystal display claimed in claim 11, wherein said incident light comprises components in a red waveband, components in a blue waveband, and components in a green waveband.

13. The liquid crystal display claimed in claim 11, wherein the respective predetermined waveband of each of said cholesteric filters is one of a red waveband, a blue waveband, and a green waveband.

14. The liquid crystal display claimed in claim 11, wherein each of said cholesteric filters comprises a first layer corresponding to said respective predetermined waveband of said cholesteric filter, and a second layer corresponding to a first waveband to be reflected by said cholesteric filter.

15. The liquid crystal display claimed in claim 11, wherein each of said cholesteric filters comprises a first layer corresponding to said respective predetermined waveband of said cholesteric filter, and a second layer corresponding to a first waveband to be reflected by said cholesteric filter, and a third layer corresponding to a second waveband to be reflected by said cholesteric filter.

16. The liquid crystal display claimed in claim 11, further comprising a polarizing plate laminated on a light output surface of said liquid crystal display panel.

* * * * *